US012365001B2

(12) United States Patent
Giusti et al.

(10) Patent No.: US 12,365,001 B2
(45) Date of Patent: Jul. 22, 2025

(54) MICROFLUIDIC DEVICE FOR SPRAYING SMALL DROPS OF LIQUIDS

(71) Applicant: STMICROELECTRONICS S.R.L., Agrate Brianza (IT)

(72) Inventors: Domenico Giusti, Monza (IT); Andrea Nicola Colecchia, Agrate Brianza (IT); Claudio Crippa, Concorezzo (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 232 days.

(21) Appl. No.: 17/381,079

(22) Filed: Jul. 20, 2021

(65) Prior Publication Data

US 2021/0346906 A1 Nov. 11, 2021

Related U.S. Application Data

(63) Continuation of application No. 15/601,623, filed on May 22, 2017, now Pat. No. 11,117,156.

(30) Foreign Application Priority Data

Nov. 23, 2016 (IT) ........................ 102016000118584

(51) Int. Cl.

*B05B 17/06* (2006.01)
*B05B 1/14* (2006.01)
*B05B 9/00* (2006.01)
*B05B 9/03* (2006.01)
(Continued)

(52) U.S. Cl.

CPC ............ *B05B 17/0646* (2013.01); *B05B 1/14* (2013.01); *B05B 9/002* (2013.01); *B05B 9/03* (2013.01); *B41J 2/1433* (2013.01)

(58) Field of Classification Search

CPC ....... B05B 17/0646; B05B 1/14; B05B 9/002; B05B 9/03; B41J 2/1433; B41J 2/14
See application file for complete search history.

(56) References Cited

U.S. PATENT DOCUMENTS

| | | | | |
|---|---|---|---|---|
| 6,718,632 | B2 * | 4/2004 | Liu | B41J 2/1603 216/41 |
| 6,964,467 | B2 * | 11/2005 | Kaneko | B41J 2/1404 347/43 |
| 7,305,764 | B2 | 12/2007 | Kitahara | |

(Continued)

FOREIGN PATENT DOCUMENTS

| | | | |
|---|---|---|---|
| CN | 1847002 | A | 10/2006 |
| CN | 101376286 | A | 3/2009 |

(Continued)

*Primary Examiner* — Qingzhang Zhou
(74) *Attorney, Agent, or Firm* — SEED IP LAW GROUP LLP

(57) ABSTRACT

A microfluidic device provided in a body accommodating a fluid containment chamber. A fluidic access channel and a drop emission channel are formed in the body and are in fluidic connection with the fluid containment chamber to form a fluidic path towards the body outside through a nozzle having an outlet section. An actuator is operatively coupled to the fluid containment chamber and is configured to cause ejection of fluid drops through the drop emission channel in an operating condition of the microfluidic device. The drop emission channel comprises a portion of reduced section having a smaller area than the outlet section of the nozzle.

11 Claims, 6 Drawing Sheets

(51) Int. Cl.
*B05B 17/00* (2006.01)
*B41J 2/14* (2006.01)

(56) References Cited

U.S. PATENT DOCUMENTS

| | | | | |
|---|---|---|---|---|
| 7,641,317 | B2 | 1/2010 | Matsui et al. | |
| 7,712,878 | B2 | 5/2010 | Takabe et al. | |
| 7,784,904 | B2 | 8/2010 | Ide et al. | |
| 9,174,445 | B1 | 11/2015 | Prati et al. | |
| 9,399,718 | B2 | 7/2016 | Ikeda et al. | |
| 9,469,109 | B2 | 10/2016 | Faralli et al. | |
| 9,630,419 | B2 | 4/2017 | Hong et al. | |
| 2002/0154191 | A1 | 10/2002 | Kanda et al. | |
| 2006/0143914 | A1* | 7/2006 | Bergstrom | B41J 2/162 347/45 |
| 2007/0279456 | A1* | 12/2007 | Shimada | B41J 2/1629 347/54 |
| 2008/0239017 | A1 | 10/2008 | Takabe et al. | |
| 2009/0309935 | A1 | 12/2009 | Koseki | |
| 2014/0313264 | A1* | 10/2014 | Cattaneo | B41J 2/1623 347/68 |
| 2015/0224784 | A1 | 8/2015 | Hong et al. | |
| 2015/0367014 | A1 | 12/2015 | Gruenbacher et al. | |
| 2015/0367356 | A1 | 12/2015 | Gruenbacher et al. | |
| 2015/0367641 | A1 | 12/2015 | Giusti et al. | |

FOREIGN PATENT DOCUMENTS

| | | | |
|---|---|---|---|
| CN | 104769053 | A | 7/2015 |
| CN | 104781077 | A | 7/2015 |
| EP | 1671794 | A1 | 6/2006 |
| JP | 2002036545 | A | 2/2002 |
| JP | 2003154665 | A | 5/2003 |
| WO | WO 2012029678 | A1 | 3/2012 |

* cited by examiner

MICROFLUIDIC DEVICE FOR SPRAYING SMALL DROPS OF LIQUIDS

BACKGROUND

Technical Field

The present disclosure relates to a microfluidic device for spraying small drops of liquids.

Description of the Related Art

As is known, for spraying inks and/or perfumes or the like, the use has been proposed of microfluidic devices of small dimensions, which may be obtained with microelectronic manufacturing techniques.

For example, U.S. Pat. No. 9,174,445 describes a microfluidic device suitable for thermally spraying ink on paper.

FIG. 1 shows a cell 11 of a microfluidic device 10 for thermal spraying inks and perfumes, similar to the device described in the above patent.

The cell 11 shown in FIG. 1 comprises a chamber 19 for containing a fluid formed inside a chamber layer 12 and delimited at the bottom by a thin layer 13, of dielectric material, and at the top by a nozzle plate 14.

A nozzle 15 is provided through the nozzle plate 14 and has a first portion 15A, facing the fluid containment chamber 19, and a second portion 15B, facing in the opposite direction (towards the outside of the microfluidic device 10). The first portion 15A is significantly wider than the second portion 15B. A heater 20 is provided within the thin layer 13, adjacent to the fluid containment chamber 19 and vertically aligned to the nozzle 15. The heater 20 may have an area of approximately 40×40 $\mu m^2$ and generate, for example, an energy of 3.5 μJ, and is able to reach a maximum temperature of 450° C. in 2 μs.

The fluid containment chamber 19 is further provided with a fluidic access 21 that enables inlet and transport of the liquid inside the fluid containment chamber 19, as indicated by an arrow L. A plurality of columns, not visible in FIG. 1, may be formed in the fluidic access 21 and have the function of preventing voluminous particles from blocking the fluidic access 21.

The microfluidic device 10 may comprise a plurality of cells 11 connected, through the fluidic accesses 21, to a liquid-supply system (not shown).

FIGS. 2A-2E are schematic illustrations of the cell 11 in operation. The liquid L reaches the fluid containment chamber 19 passing through the fluidic access 21 (FIG. 2A), to form a liquid layer 16 having, for example, a thickness of 0.3 μm. The heater 20 heats the liquid layer 16 up to a preset temperature (FIG. 2B). This temperature is chosen, on the basis of the liquid used, to allow the liquid to instantaneously reach the boiling point, for example at a temperature close to 300° C. In this situation, the pressure increases to a high level, for example approximately 5 atm, forming a vapor bubble 17, which disappears after a few microseconds, for example 10-15 μs. The pressure thus generated pushes a liquid drop 18 through the nozzle 15, as shown in FIGS. 2C-2D, then the liquid layer 16 returns into the initial condition (FIG. 2E).

Another type of microfluidic device suitable for thermal spraying fluids is based upon the piezoelectric principle. An embodiment of a microfluidic device 30 of this type is described, for example, in US 2014/0313264 and is shown in FIG. 3.

The microfluidic device 30 of FIG. 3 comprises a bottom portion, an intermediate portion, and a top portion, arranged on top of each other and bonded together.

The bottom portion is formed by a first region 32, of semiconductor material, having an inlet channel 40.

The intermediate portion is formed by a second region 33, of semiconductor material, which laterally delimits a fluid containment chamber 31. The fluid containment chamber 31 is further delimited at the bottom by the first region 32 and at the top by a membrane layer 34, for example of silicon oxide. The area of the membrane layer 34 above the fluid containment chamber 31 forms a membrane 37. The membrane layer 34 has a thickness that allows it to deflect, for example, by approximately 2.5 μm.

The top portion is formed by a third region 38, of semiconductor material, which delimits an actuator chamber 35, overlying the fluid containment chamber 31. The third region 38 has a through channel 41, in communication with the fluid containment chamber 31 through a corresponding opening 42 in the membrane layer 34.

A piezoelectric actuator 39 is arranged over the membrane 37, in the actuator chamber 35. The piezoelectric actuator 39 is formed by a pair of electrodes 43, 44, arranged on top of each other, and an intermediate layer of piezoelectric material 29, for example PZT (Pb, Zr, $TiO_3$).

A nozzle plate 36 is arranged on top of the third region 38, bonded thereto by a bonding layer 47. The nozzle plate 36 has a hole 48, arranged over, and fluidically connected with, the channel 41 through an opening 46 in the bonding layer 47. The hole 48 constitutes a nozzle of a drop emission channel, designated as a whole by 49 and comprising also the through channel 41 and the openings 42, 46.

In use, the fluid containment chamber 31 is filled with a fluid or liquid to be ejected through the inlet channel 40. Then, in a first step, the piezoelectric actuator 39 is controlled so as to cause deflection of the membrane 37 towards the inside of the fluid containment chamber 31. This deflection causes a movement of the fluid present in the fluid containment chamber 31 towards the drop emission channel 49, and generates controlled expulsion of a drop, as represented by the arrow 45. In a second step, the piezoelectric actuator 39 is controlled in the opposite direction so as to increase the volume of the fluid containment chamber 31, recalling further fluid through the inlet channel 40.

In either case (thermal or piezoelectric actuation), current microfluidic devices are able to generate drops of medium-to-large size, which exceed considerably the desired size for use as nebulizers.

For example, current high density print heads (up to 1200 dpi) produce drops of a minimum size of two picolitres (2 $pl=2\cdot 10^{15}\ m^3$), which correspond to spherical drops having a diameter of approximately 7.8 μm. At present, with current technologies, it is possible to produce nozzles with a minimum size of approximately 6 μm. For nebulizers, on the other hand, it is desired to generate drops of smaller diameter, as small as 1 μm, corresponding to a volume of approximately 0.0045 pl ($4.5\cdot 10^{-18}\ m^3$). To do this, it would be necessary to have nozzles of sublithographic diameter, i.e., of dimensions much smaller than those obtainable with the current photolithographic technology used in the manufacture of semiconductors.

BRIEF SUMMARY

One or more embodiments are directed to a device configured to eject a fluid with small droplets. According to one embodiment of the present disclosure, a microfluidic device is provided. The microfluidic device comprises a body housing a fluid containment chamber, a fluidic access channel, a drop emission channel, and an actuator. The fluid access channel is in fluidic connection with the fluid containment chamber. The drop emission channel is configured to provide a fluidic path between the fluid containment chamber and a body outside. The drop emission channel comprises a nozzle forming an outlet section having a first area. The drop emission channel comprises a portion of reduced section having an area smaller than the first area. The actuator is operatively coupled to the fluid containment chamber and configured to cause ejection of drops of fluid through the drop emission channel in an operating condition of the microfluidic device.

BRIEF DESCRIPTION OF THE SEVERAL VIEWS OF THE DRAWINGS

For a better understanding of the present disclosure, preferred embodiments thereof are now described, purely by way of non-limiting example, with reference to the attached drawings, wherein.

DETAILED DESCRIPTION

The present device is based upon the principle of forming a portion of the drop emission channel with an effective cross-section having a smaller area than the cross-section of the rest of the drop emission channel. This is obtained by forming a part of the drop emission channel (for example, the nozzle) partially offset with respect to the rest of the drop emission channel, overlying it or underlying it. In practice, in the present device, the area of the nozzle and the area of the rest of the drop emission channel have a non-zero intersection which has a smaller area than the entire nozzle area. In this way, it is possible to obtain a choking in the drop emission channel, i.e., a useful drop emission area which is smaller than the one achievable with existing or future manufacturing techniques.

Figure 4:
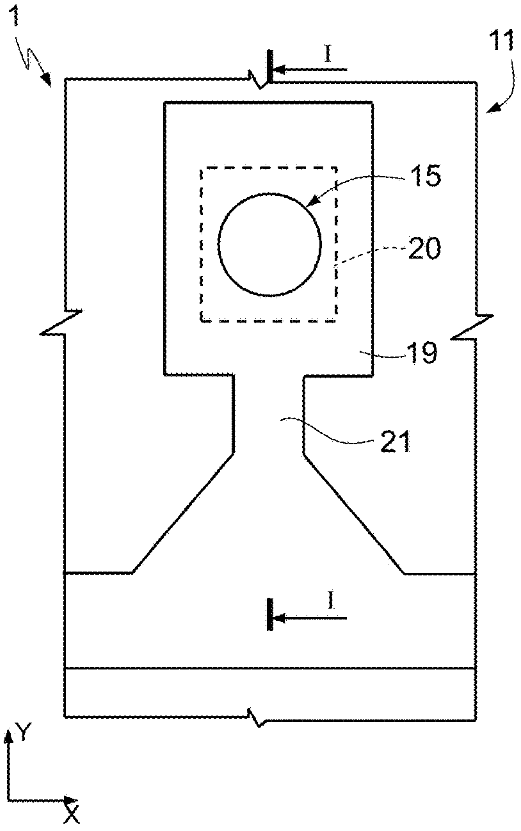
FIG. 4 is a simplified top plan view, with parts in see-through view, of the chamber of the microfluidic device of a thermal type of FIG. 1.
Figure 5:
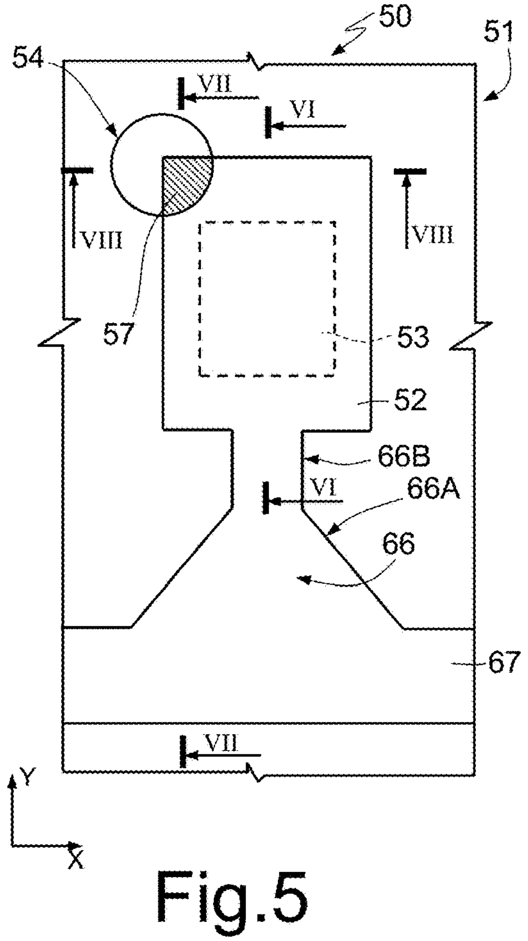
FIG. 5 is a simplified top plan view, with parts in see-through view, of one embodiment of the present microfluidic device of a thermal type.

The above principle is highlighted by comparing FIGS. 4 and 5, which show, respectively, in a simplified way, the position of the nozzle with respect to the fluid containment chamber in the case of a microfluidic device with thermal generation according to the prior art and according to an embodiment of the present device.

Figure 1:
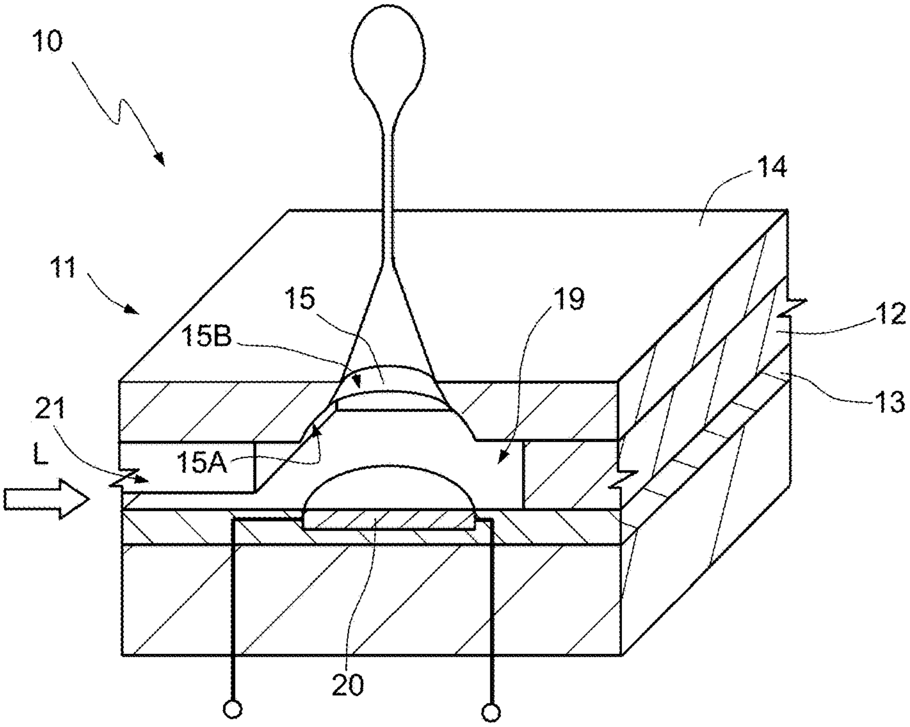
FIG. 1 is a perspective cross-section of a chamber of a known microfluidic device of a thermal type.
Figure 2A:
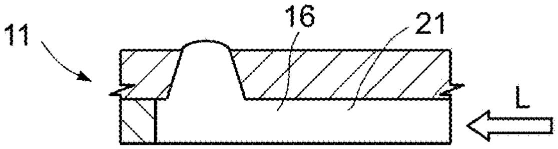
FIGS. 2A-2E show the operation of the chamber of FIG. 1.
Figure 2B:
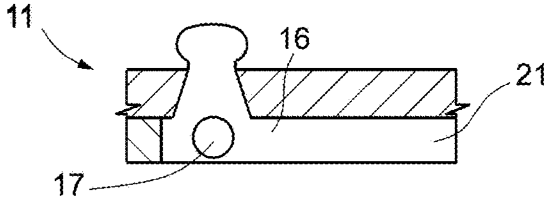
Figure 2C:
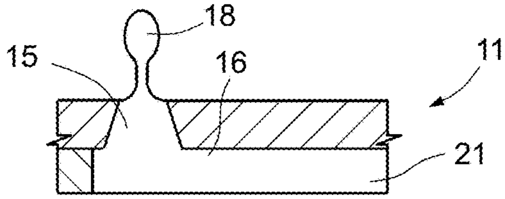
Figure 2D:
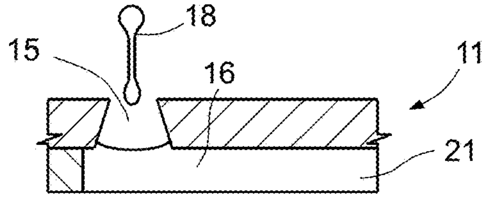
Figure 2E:
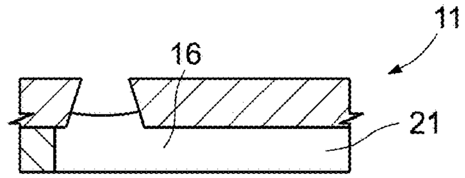

In FIG. 4, representing in a simplified way the cell 11 of FIG. 1 and thus using the same reference numbers, the nozzle 15 is arranged substantially centered with respect to the top of the fluid containment chamber 19 and of the heater 20.

FIG. 5 shows in a simplified way a cell 51 of a microfluidic device 50. The cell 51 is formed in a body 100 of micrometric dimensions and comprises a fluid containment chamber 52, a fluidic inlet 66 connected to a fluid supply channel 67, a heater 53, and a drop emission channel, here formed by a nozzle 54. The nozzle 54 is arranged offset with respect to the fluid containment chamber 52, and precisely its cross-section (base area) is no longer comprised within the area of the fluid containment chamber 52, but an intersection area between the two areas exists, designated by 57 and represented hatched in FIG. 5, and is of a smaller size than the area of the nozzle 54, such that the size of the intersection area is less than the size of the nozzle opening.

Figure 6:
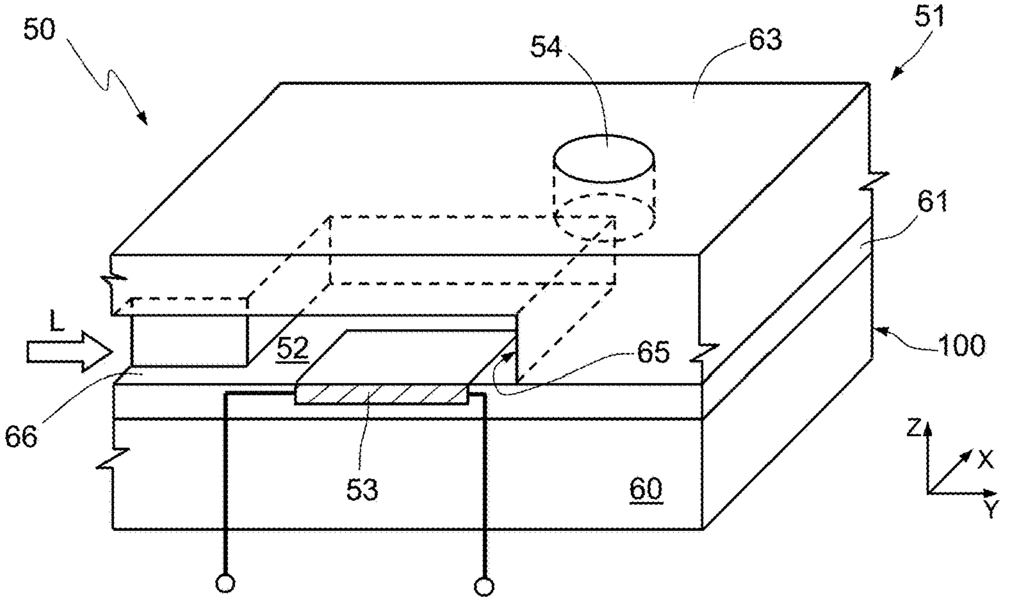
FIG. 6 is a perspective cross-section, taken along section plane VI-VI of FIG. 5, of a cell of the microfluidic device of FIG. 5.
Figure 7:
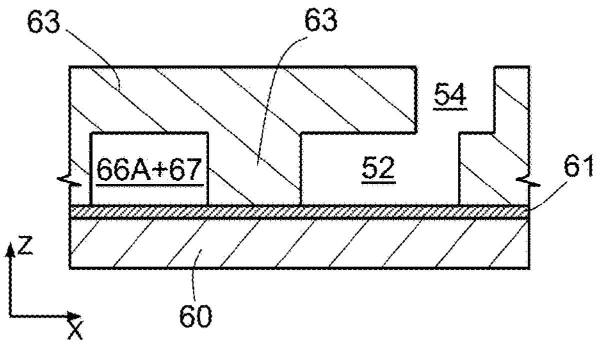
FIG. 7 is a cross-section of the chamber of FIG. 5, taken along section plane VII-VII.
Figure 8:
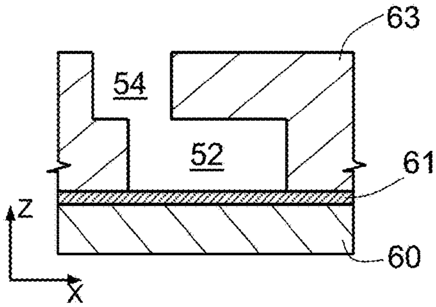
FIG. 8 is a cross-section of the chamber of FIG. 5, taken along section plane VIII-VIII.

The cell 51 may be manufactured as shown in FIGS. 6-8. Here, the device 50 is formed by a substrate 60, for example of semiconductor material, covered by an insulating layer 61, for example of silicon oxide. A chamber layer 63 extends over the insulating layer 61, for example of polymeric material such as dry film.

In the cell 51, a heater 53 is formed within the insulating layer 61 and forms an actuator. The fluid containment chamber 52 is formed within the chamber layer 63, above the heater 62, facing the insulating layer 61. The fluid containment chamber 52 here has a parallelepipedal shape with approximately rectangular base, parallel to a plane XY of a Cartesian system XYZ, with a height (in the direction Z) smaller than the thickness of the chamber layer 63. The fluid containment chamber 52 is laterally delimited by walls 65 that define a lateral surface of the fluid containment chamber 52. The fluidic access 66, formed in the chamber layer 63, connects the fluid containment chamber 52 with a fluid supply channel 67, schematically represented in FIG. 5 and visible in the cross-section of FIG. 7. The fluidic access 66 may have the shape shown schematically in FIG. 5, with a first portion 66A, which is wider, contiguous to the fluid supply channel 67, and a second portion 66B, which is narrower, contiguous to the fluid containment chamber 52. In the first portion 66A, columns (not shown) may be present for preventing large particles from blocking the fluidic access 66.

The nozzle 54, which here has a cylindrical shape with circular base, is formed in the top part of the chamber layer 63 and is arranged at one corner of the fluid containment chamber 52, so that a portion of the surface of the walls 65 extends through its base area. In particular, the intersection 54 here has an area that is approximately one quarter of the base area of the nozzle 54.

The cell 51 may be manufactured by initially forming, on the substrate 60, a sacrificial structure having a shape corresponding to the fluid containment chamber 52, of the fluidic access 66, and of the fluid supply channel 67, then depositing polymeric material intended to form the chamber layer 63. In particular, the chamber layer 63 may be formed using lamination and reflow techniques, in a per se known way in the microinjector technique. Next, the chamber layer 63 is perforated, via selective etching and using common photolithographic techniques, to form the nozzle 54.

Alternatively, the chamber layer 63 may be separately molded and bonded on the insulating layer 61, or formed in a dug silicon structure, bonded to the insulating layer 61. According to a different embodiment, the chamber layer 63 may be formed by two separate layers or regions, glued together.

Figure 9:
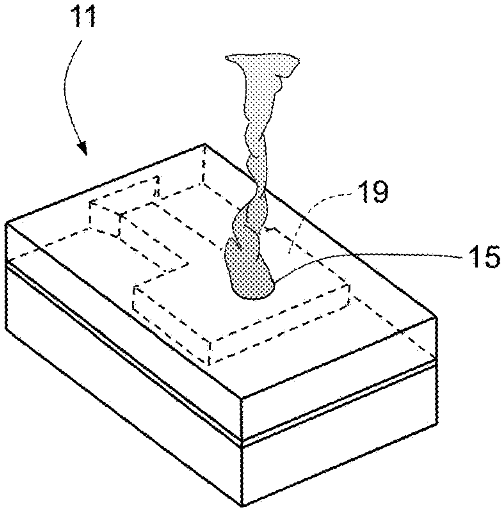
FIG. 9 shows schematically in perspective view the generation of a drop in the known cell of FIG. 1.
Figure 10:
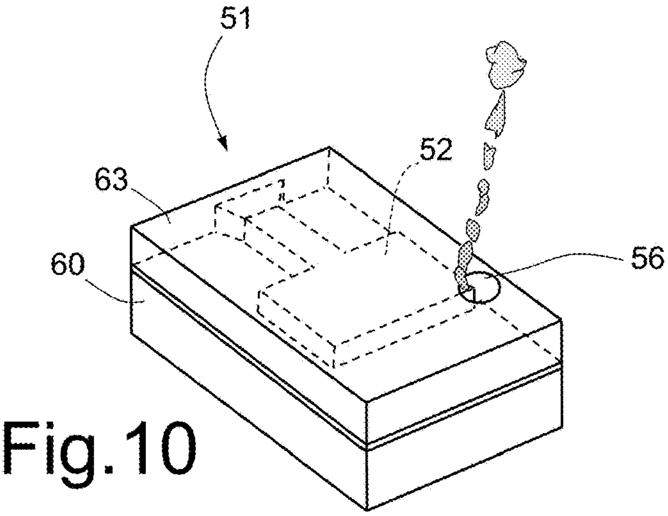
FIG. 10 shows schematically in perspective view the generation of a drop in the cell of FIG. 5.

The intersection 54 causes the useful area of the nozzle 54 to be reduced as compared to its physical dimensions obtainable with the current lithographic definition processes, and allows obtainment of drops of smaller dimensions as compared to devices micromachined using the same technology, as shown also in the simulations of FIGS. 9 and 10, showing, respectively, generation of a drop of a same fluid with the cell 11 of FIG. 4 and with the cell 51 of FIG. 5.

Figure 11:
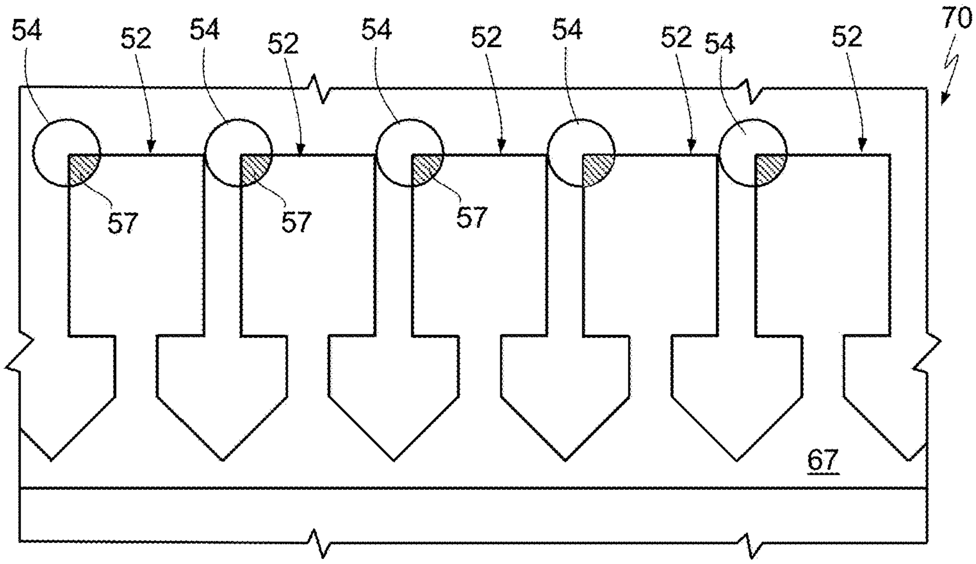
FIG. 11 is a simplified top plan view of a portion of an embodiment of the present device, comprising a plurality of cells.

The fluid containment chamber 52 may form part of an array of drop-generation chambers 52 arranged side by side and connected to a same fluid supply channel 67, as shown in FIG. 11, to form a nebulizer 70.

The nozzle 54 and the fluid containment chamber 52 may have different shapes and mutual arrangements. For example, the fluid containment chamber 52 may have a cylindrical or polyhedral shape as desired, whether regular or irregular, with the nozzle arranged so as to intersect (in top plan view) the circumference or perimeter of the base. Further, a number of nozzles may be provided for each fluid containment chamber.

Figure 12A:
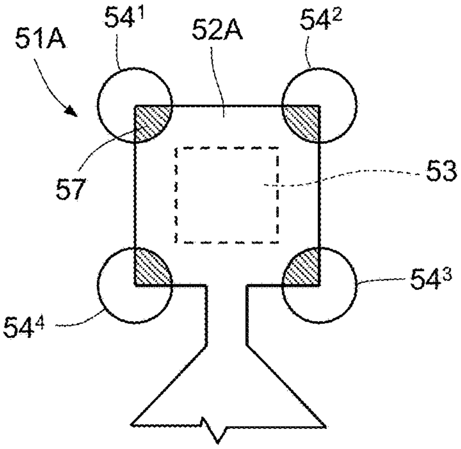
FIGS. 12A-12D are simplified top plan views of different embodiments of the chamber of FIG. 5.

For example, FIG. 12A shows a cell 51A formed in a body 150 of micrometric dimensions having a fluid containment chamber 52A with a square base, with a nozzle $\mathbf{54}^1$-$\mathbf{54}^4$ arranged on each corner thereof. In this way, the intersection 57 between each nozzle $\mathbf{54}^1$-$\mathbf{54}^4$ and the fluid containment chamber 52A has a smaller area than the respective nozzle $\mathbf{54}^1$-$\mathbf{54}^4$, which thus emits a drop of reduced size, but as a whole the four intersections have an area approximately equal to a known cell 11, thus improving the density of the drops emitted by each fluid containment chamber 52A.

Figure 12B:
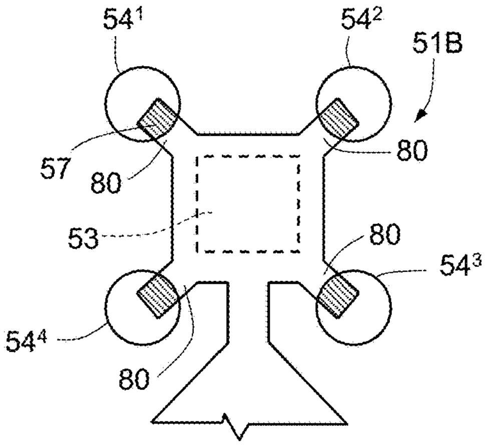

FIG. 12B shows a cell 51B having a fluid containment chamber 52B with a base that also here is square, with protuberances 80 extending from each corner of the square along the diagonals. The cell 51B of FIG. 12B comprises four nozzles $\mathbf{54}^1$-$\mathbf{54}^4$, partially overlapping the protuberances 80. The nozzles $\mathbf{54}^1$-$\mathbf{54}^4$ may have a greater diameter than the width of the protuberances 80, since the latter may have smaller dimensions than the nozzles, due to the different manufacturing techniques.

Figure 12C:
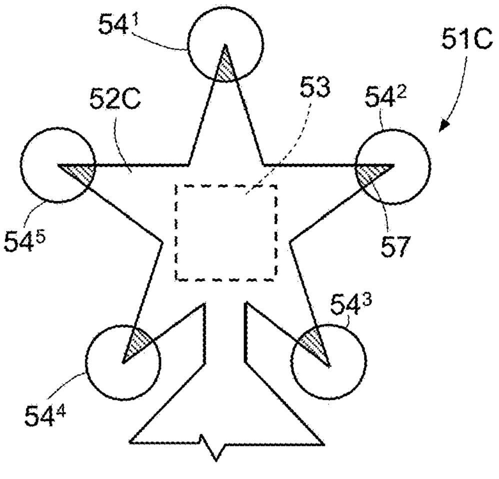

FIG. 12C shows a cell 51C having a star-shaped fluid containment chamber 52C having five points, on each whereof a respective nozzle $\mathbf{54}^1$-$\mathbf{54}^5$ is formed.

Figure 12D:
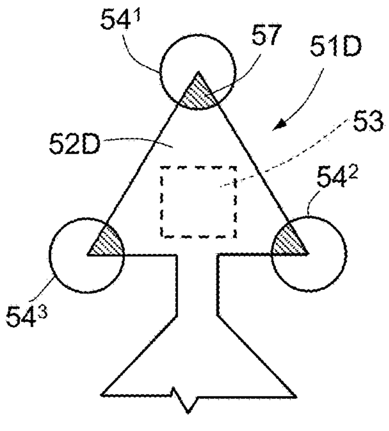

FIG. 12D shows a cell 51D having a fluid containment chamber 52D of a triangular shape having three vertices on which nozzles $\mathbf{54}^1$-$\mathbf{54}^3$ are formed.

Also in the cells 51B-51D a reduction in volume of the drops emitted is then obtained, without excessively penalizing the emitted liquid density.

Figure 3:
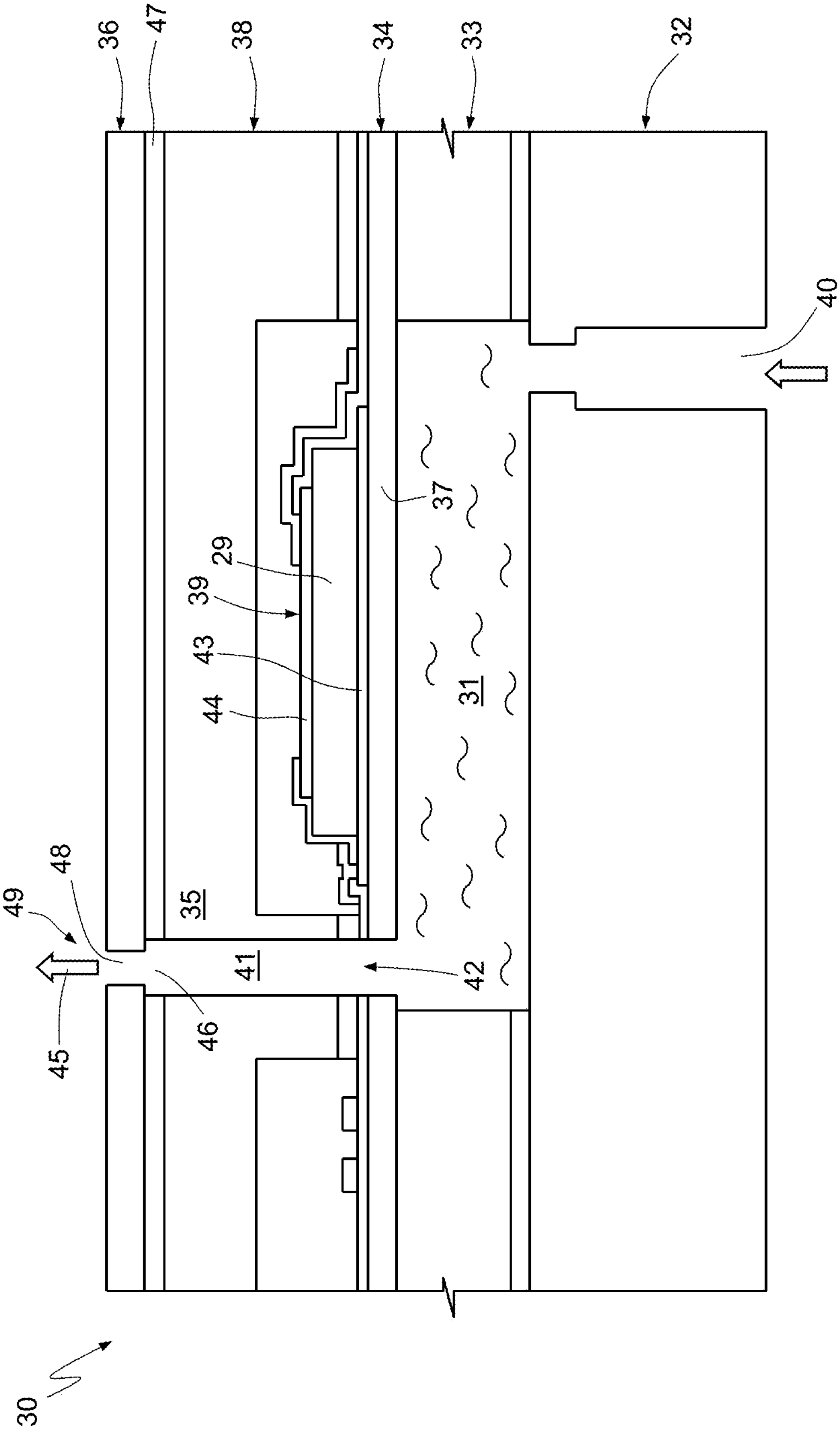
FIG. 3 is a cross-section of a chamber of a known microfluidic device of a piezoelectric type.
Figure 13B:
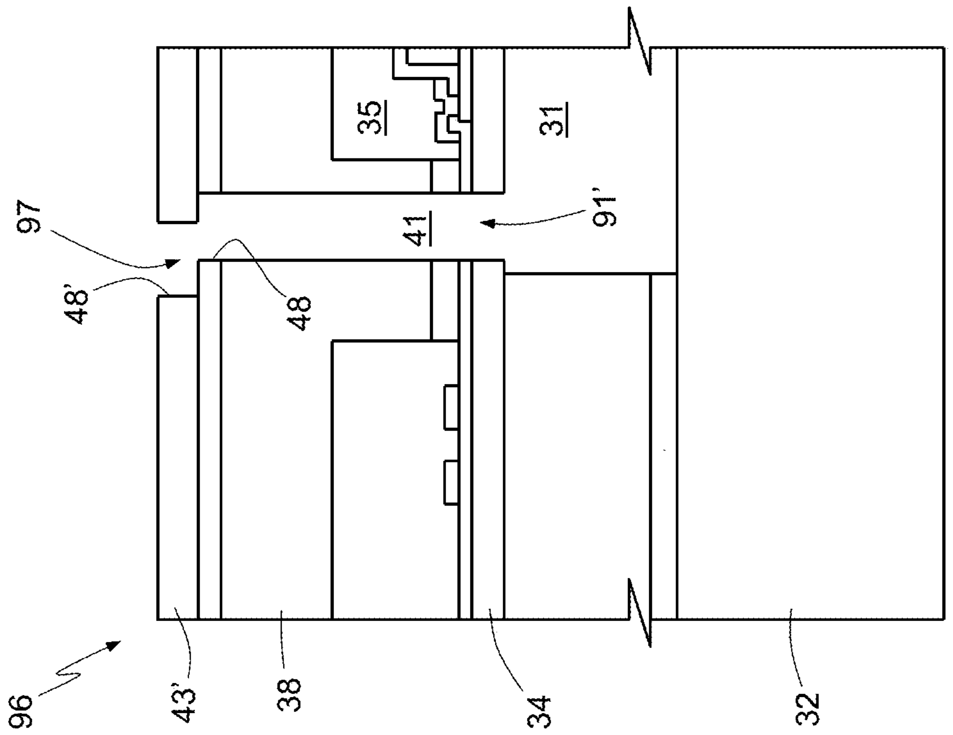
FIGS. 13A and 13B are cross-sections, similar to FIG. 3, of a part of cell of a different embodiment of the present microfluidic device, with actuation of a piezoelectric type.
Figure 13A:
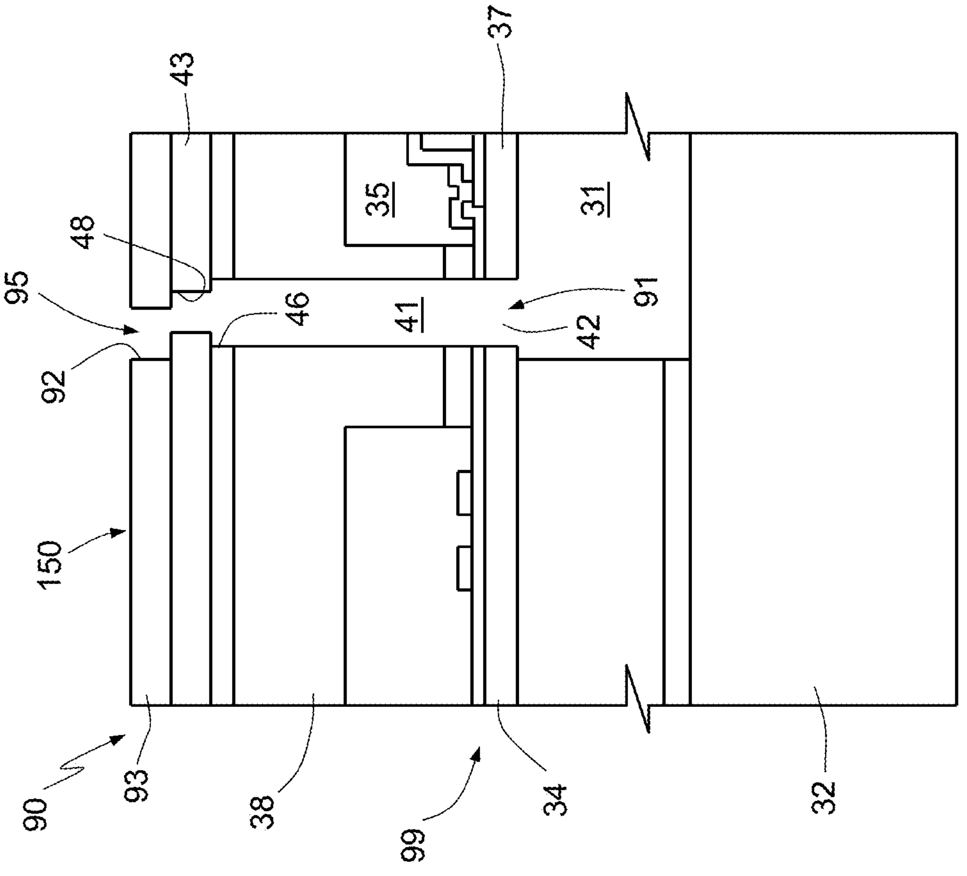

FIG. 13A shows a portion of a cell 99 of a microfluidic device 90 of a piezoelectric type. The microfluidic device 90 has the same base structure as the microfluidic device 30 of FIG. 3 and has thus been represented only in part, using the same reference numbers, and differs from the embodiment of FIG. 3 as regards the configuration of the drop emission channel, here designated by 91. In detail, in the microfluidic device 90, the drop emission channel 91 comprises, in addition to the through channel 41, the openings 42, 46, and the hole 48 in the nozzle plate 36 (the latter items being referred to hereinafter as first hole 48 and first plate 36), a second hole 92. The second hole 92 is arranged partially offset to the first hole 48 so as to form an intersection having a smaller area than the holes 48, 92, as described for the intersection 57 of FIG. 5. The second hole 92 is here formed in a second nozzle plate 93 bonded to the nozzle plate 36 (designated hereinafter as first nozzle plate 36), and the drop emission nozzle, here designated by 95, is formed by the two holes 48, 92. Thereby, the drop emission nozzle 95 is formed by two channel portions that are partially not aligned, reducing the outlet section of the liquid drop expelled from the chamber 31 as a result of the deflection of the membrane 37, like the drop-generation cell 52 of FIG. 5.

FIG. 13B shows a microfluidic device 96 of a piezoelectric type similar to the microfluidic device 90 of FIG. 13A. Unlike this, the microfluidic device 96 has a single nozzle plate (here designated by 43'). The drop emission channel, here designated by 91', has a nozzle 97 formed by a hole 48' in the nozzle plate 43' that is offset with respect to the through channel 41 in the third region 38. In this way, the nozzle 97 has an effective cross-section of small dimensions, like the microfluidic device 90 of FIG. 13A.

Finally, it is clear that modifications and variations may be made to the microfluidic device described and illustrated herein, without thereby departing from the scope of the present disclosure. For example, the different embodiments described may be combined so as to provide further solutions.

Further, the shape of the nozzle base may differ from the one shown; for example, it may be oval or polygonal.

In the microfluidic device with piezoelectric actuation, the reduction of the useful section could be obtained at the inlet mouth of the through channel 41, by appropriately staggering the mouth of the channel 41 with respect to the fluid containment chamber 31.

Further, also in the microfluidic device with piezoelectric actuation, the fluid containment chamber 35 may have any shape, for example a polyhedral shape having a base with projecting vertices, points, or portions. Also in this case, the fluidic path may comprise a plurality of nozzles partially overlapping the projecting vertices, points, or portions, so as to form intersections of reduced area.

Also for the microfluidic device with piezoelectric actuation, it is possible to arrange a plurality of cells of the type shown in FIGS. 13A and 13B, alongside each other, with inlet channels 40 connected to a common supply channel, for forming a nebulizer.

Further, in all the microfluidic devices, the fluid containment chamber may have a cylindrical shape with circular or oval base, and the nozzle or nozzles may be arranged straddling the circumference of the circular or oval base.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

forming a channel in a body including a plurality of layers;

forming a fluid containment chamber in the body and in fluid communication with the channel, the fluid containment chamber including a base and a sidewall extending from the base;

forming a nozzle having an opening at an outer surface of the body that is configured to expel fluid, the opening being partially offset from the fluid containment chamber such that the opening overlies the sidewall of the fluid containment chamber and a portion of the base of the fluid containment chamber, the opening having a first portion that overlies the fluid containment chamber and a second portion that does not overlie the fluid containment chamber, the nozzle having an outlet section having a first area, the outlet section being in fluid communication with the fluid containment chamber by a fluid path, the fluid path having a second area, the second area being smaller than the first area, the channel, the fluid containment chamber, and the nozzle being formed in the same layer of the plurality of layers; and forming an actuator operatively coupled to the fluid containment chamber and configured to cause ejection of drops of fluid from the fluid containment chamber and through the nozzle, the actuator including a heater.

2. The method according to claim 1 wherein forming the nozzle comprises forming a plurality of nozzles, each nozzle being partially offset from the fluid containment chamber, the plurality of nozzles having outlet sections having first areas, each of the plurality of nozzles being in fluid communication with the fluid containment chamber by a plurality of fluid paths having second areas, the second areas being smaller than the first area.

3. The method according to claim 2 wherein forming the plurality of nozzles comprises forming the plurality of nozzles to partially overlap edges of the fluid containment chamber.

4. The method according to claim 1 wherein forming the fluid containment chamber comprises forming a fluid containment chamber having a tapered inlet.

5. A method, comprising:

forming a channel in a body including a plurality of layers;

forming a fluid containment chamber in the body and in fluid communication with the channel;

forming a drop emission channel including a nozzle having an opening at an outer surface of the body that is configured to expel fluid, the opening of the nozzle partially overlapping the fluid containment chamber such that the opening has a first portion that overlies the fluid containment chamber and a second portion that does not overlie the fluid containment chamber, the nozzle having an outlet section having a first area, the outlet section being in fluid communication with the fluid containment chamber by a fluid path, the fluid path having a second area smaller than the first area, the channel, the fluid containment chamber, and the nozzle being formed in the same layer of the plurality of layers; and forming an actuator operatively coupled to the fluid containment chamber and configured to cause ejection of drops of fluid from the fluid containment chamber and through the nozzle, the actuator including a heater.

6. The method according to claim 5 wherein forming the drop emission channel including the nozzle having the opening at the outer surface of the body comprises forming a plurality of drop emission channels, each including a respective nozzle having a respective opening at the outer surface of the body.

7. The method according to claim 6 wherein the openings of the nozzles partially overlap the fluid containment chamber and partially overlap a portion of the body that does not include the fluid containment chamber.

8. The method according to claim 5 wherein forming the fluid containment chamber comprises forming a fluid containment chamber having a tapered inlet.

9. The method according to claim 5, further comprising forming the fluid containment chamber in a semiconductor body.

10. A method, comprising:

forming a channel in a body including a plurality of layers;

forming a fluid containment chamber in the body and in fluid communication with the channel; and forming a nozzle having an opening at an outer surface of the body that is configured to expel fluid, the opening of the nozzle partially overlapping the fluid containment chamber such that the opening has a first portion that overlies the fluid containment chamber and a second portion that does not overlie the fluid containment chamber, the nozzle having an outlet section having a first area, the outlet section being in fluid communication with the fluid containment chamber by a fluid path, the fluid path having a second area smaller than the first area, the channel, the fluid containment chamber, and the nozzle being formed in the same layer of the plurality of layers.

11. The method according to claim 10 wherein the nozzle is arranged at a perimeter of the fluid containment chamber.

* * * * *